(12) United States Patent
Chen et al.

(10) Patent No.: US 7,679,841 B2
(45) Date of Patent: Mar. 16, 2010

(54) OPTICAL SYSTEM FOR TAKING IMAGE

(75) Inventors: Chun Shan Chen, Taichung (TW);
Hsiang Chi Tang, Taichung (TW); Yeo Chih Huang, Taichung (TW); Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 335 days.

(21) Appl. No.: 11/558,991

(22) Filed: Nov. 13, 2006

(65) Prior Publication Data
US 2008/0062536 A1  Mar. 13, 2008

(30) Foreign Application Priority Data
Sep. 7, 2006  (TW) ................ 95133081 A

(51) Int. Cl.
*G02B 13/18* (2006.01)

(52) U.S. Cl. ..................... 359/716; 359/708

(58) Field of Classification Search ................ 359/716, 359/715, 708, 784, 789
See application file for complete search history.

(56) References Cited

U.S. PATENT DOCUMENTS

| | | | |
|---|---|---|---|
| 6,728,047 B2* | 4/2004 | Sato et al. ................ 359/786 |
| 6,970,306 B2* | 11/2005 | Matsuo .................... 359/716 |
| 7,184,225 B1* | 2/2007 | Noda ....................... 359/784 |
| 2003/0210475 A1* | 11/2003 | Shinohara ................ 359/716 |
| 2005/0275950 A1* | 12/2005 | Kubota et al. ............ 359/689 |

FOREIGN PATENT DOCUMENTS

| JP | 2005-292235 A | 10/2005 |
|---|---|---|
| JP | 2005292235 A | * 10/2005 |

\* cited by examiner

*Primary Examiner*—Joseph Martinez
*Assistant Examiner*—James R Greece
(74) *Attorney, Agent, or Firm*—Banger Shia

(57) ABSTRACT

An optical system for taking image comprises three lens elements with refractive power, wherein a first lens element with positive refractive power includes at least one aspheric surface, a second lens element with negative refractive power, and a third lens element with negative refractive power includes at least one aspheric surface, which are mounted orderly from the object side to the image side. By such arrangements, the volume of the lens assembly can be reduced, and can obtain high resolution.

12 Claims, 8 Drawing Sheets

OPTICAL SYSTEM FOR TAKING IMAGE

FIELD OF THE INVENTION

The present invention relates to an optical system, and more particularly to a miniaturized optical system for taking image used in a camera mobile phone.

DESCRIPTION OF THE PRIOR ART

In recent years, with the popularity of camera mobile phone, the optical system for taking image has been becoming thinner and thinner, and the photosensitive assembly of a general digital camera is nothing more than CCD (charge coupled device) or CMOS (Complementary Metal Oxide Semiconductor). Due to the advancement of the semiconductor technique, the pixel size of photosensitive assembly has been being reduced continuously, and the development of the miniaturized optical system for taking image is toward the high resolution field. Therefore, the demand for the image quality becomes increasingly urgent.

A conventional mobile phone's lens assembly usually consists of three lenses: from the object side to the image side: a first lens element with positive refractive power, a second lens element with negative refractive power and a third lens element with positive refractive power, thus forming the so-called type of Triplet. Although such type of triplet can correct most of the aberration produced by the system, and the field of view is quite extensive, the demand for the total optical height is bigger. Thereby the demand for the conventional structure is bigger, which is inapplicable to a more miniaturized optical system for taking image.

The present invention has arisen to mitigate and/or obviate the afore-described disadvantages.

SUMMARY OF THE INVENTION

The primary objective of the present invention is to improve the image quality of the optical system and effectively reduce the size of the lens assembly, the present invention provides a whole new three-lens type optical system.

An optical system for taking image in accordance with the present invention comprises: from the object side to the image side:

a first lens element with positive refractive power being provided with at least one aspheric surface;

a second lens element with negative refractive power;

a third lens element with negative refractive power being provided with at least one aspheric surface.

In the optical system for taking image, the refractive power of the optical system for taking image of the present invention is mainly provided by the first lens element with positive refractive power, and the second lens element and the third lens element with negative refractive power serve to balance and correct the various aberrations caused by the system.

The first lens element provides a strong positive refractive power, and the aperture stop is located close to the object side, so that the height of the optical system for taking image can be reduced effectively, and the exit pupil of the optical lens assembly will be far away from the image plane. Therefore, the light will be projected onto the photosensitive assembly with a relatively small incident angle, and this is the telecentric feature of the image side. And at least one inflection point is formed on the aspheric surface of the third lens element to contribute to a better correction of the incident angle of the off axis light with respect to the photosensitive assembly. The telecentric feature is very important to the photosensitive power of the current solid photosensitive assembly, and can improve the photosensitivity of the photosensitive assembly while reducing the probability of the occurrence of shading.

The further objective of the present invention is to provide an optical system for taking image which can reduce the aberration and the number of the lenses. In addition, the trend of miniaturization of the optical lens assembly, and of increasing the field of view, so the focal length of the optical system is shorter. Therefore, the radius of curvature and the size of the lenses must be reduced, and it is impossible to make such glass lenses by the use of the conventional grind method. Plastic material is introduced to make lenses by injection molding, using a relatively low cost to produce high precision lenses. The surface of lens is aspheric for obtaining much more controlled variables, so as to reduce the aberration and the number of the lenses.

In the optical system for taking image, an Abbe number of the second lens element is V2, and it satisfies the relation:

$V2<40$

The abovementioned relation can effectively correct the chromatic aberration caused by the system, and improve the resolution of the optical system for taking image. And it will be better if the Abbe number V2 of the second lens element satisfies the relation:

$V2<28$

Further, it will be better if the Abbe number V2 of the second lens element satisfies the relation:

$V2<24$

In the optical system for taking image, the Abbe number of the first lens element is V1, the Abbe number of the third lens element is V3, and they satisfy the relations:

$V1>50$ $V3>50$

The abovementioned relation can effectively correct the chromatic aberration caused by the system.

The optical system for taking image, which includes the first lens element with positive refractive power having a convex front surface and a concave rear surface, the second lens element with negative refractive power having a concave front surface and a convex rear surface, and the third lens element with negative refractive power having a convex front surface and a concave rear surface. By such arrangements, the image quality can be improved effectively.

In the optical system for taking image, a radius of curvature of the front surface of the first lens element is R1, and the radius of curvature of the rear surface of the first lens element is R2, and they satisfy the relations:

$0.2<R1/R2<0.5$

When the value of R1/R2 is set to be smaller than the low limit as stated above, R1 will be smaller, and the aberration of the system will be too great and is difficult to control. On the other hand, when the value of R1/R2 is set to be bigger than the high limit as stated above, R1 becomes bigger, and the refractive power of the first lens element will be smaller, as a result, the aperture stop must be moved to the more forward position to reduce the incident angle of the light with respect to the photosensitive assembly that will inapplicable to a miniaturized optical system for taking image.

In the optical system for taking image, the radius of curvature of the front surface of the second lens element is R3, and the radius of curvature of the rear surface of the second lens element is R4, and they satisfy the relations:

$0.6<R3/R4<1.0$

When the value of R3/R4 is set to be smaller than the low limit as stated above, R3 will be smaller, and the total height of the optical system will be too great. On the other hand, when the value of R3/R4 is set to be bigger than the high limit as stated above, R3 will be greater, as a result, the chromatic aberration caused by the system will be difficult to correct.

In the optical system for taking image, the radius of curvature of the front surface of the third lens element is R5, and the radius of curvature of the rear surface of the third lens element is R6, and they satisfy the relations:

1.0<R5/R6<5.0

The abovementioned relation can effectively correct the high order aberration of the system, further, it will be better if R5/R6 satisfies the relation:

1.5<R5/R6<4.0

The height SAG31 at the position of the effective diameter of the front surface of the third lens satisfies the relation:

SAG31<0 mm

The height of a surface at the position of the effective diameter is defined as: the height of a point on the surface at the effective diameter relative to a plane normal to the axis passing through the on-axis surface vertex. When the surface at the position of the effective diameter is closer to the image side than the on-axis surface vertex, the height is positive; if instead the surface at the position of the effective diameter is closer to the object side than the on-axis surface vertex, the height is negative.

By such arrangements, the incident angle of the light with respect to the photosensitive assembly can be effectively reduced while improving the correction of the off axis aberration. It will be better if SAG31 satisfies the relation:

SAG31<−0.1 mm

Further, it will be better if SAG31 satisfies the relation:

SAG31<−0.2 mm

In the optical system for taking image, the focal length of the first lens element is f1, the focal length of the second lens element is f2, the focal length of the third lens element is f3, and the focal length of the optical system is f, they satisfy the relations:

|f/f1|>1.0
|f/f2|>0.1
|f/f3|>0.2

The abovementioned relation can effectively compress the total height of the optical system and can maintain a good image quality.

In the optical system for taking image, the distance between the second lens element and the third lens element is T23, and it satisfies the relation:

T23>0.2 mm

The abovementioned relation can effectively correct the off axis aberration of the optical system.

In the optical system for taking image, the distance between the second lens element and the third lens element is T23, and it satisfies the relation:

T23<0.08 mm

The abovementioned relation can reduce the height of the total optical system.

In the optical system for taking image, the center thickness of the second lens element is CT2, and it satisfies the relation:

CT2<0.38 mm

The abovementioned relation can effectively reduce the height of the total optical system, and it will be better if CT2 satisfies the relation:

CT2<0.34 mm

In the optical system for taking image, the edge thickness of the first lens element is ET1, and it satisfies the relation:

ET1<0.4 mm

The edge thickness is defined as: the length projected on an optical axis by the distance between the positions of the effective diameter of the front and the rear surfaces of the lens. The abovementioned relation can reduce the height of the total optical system.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
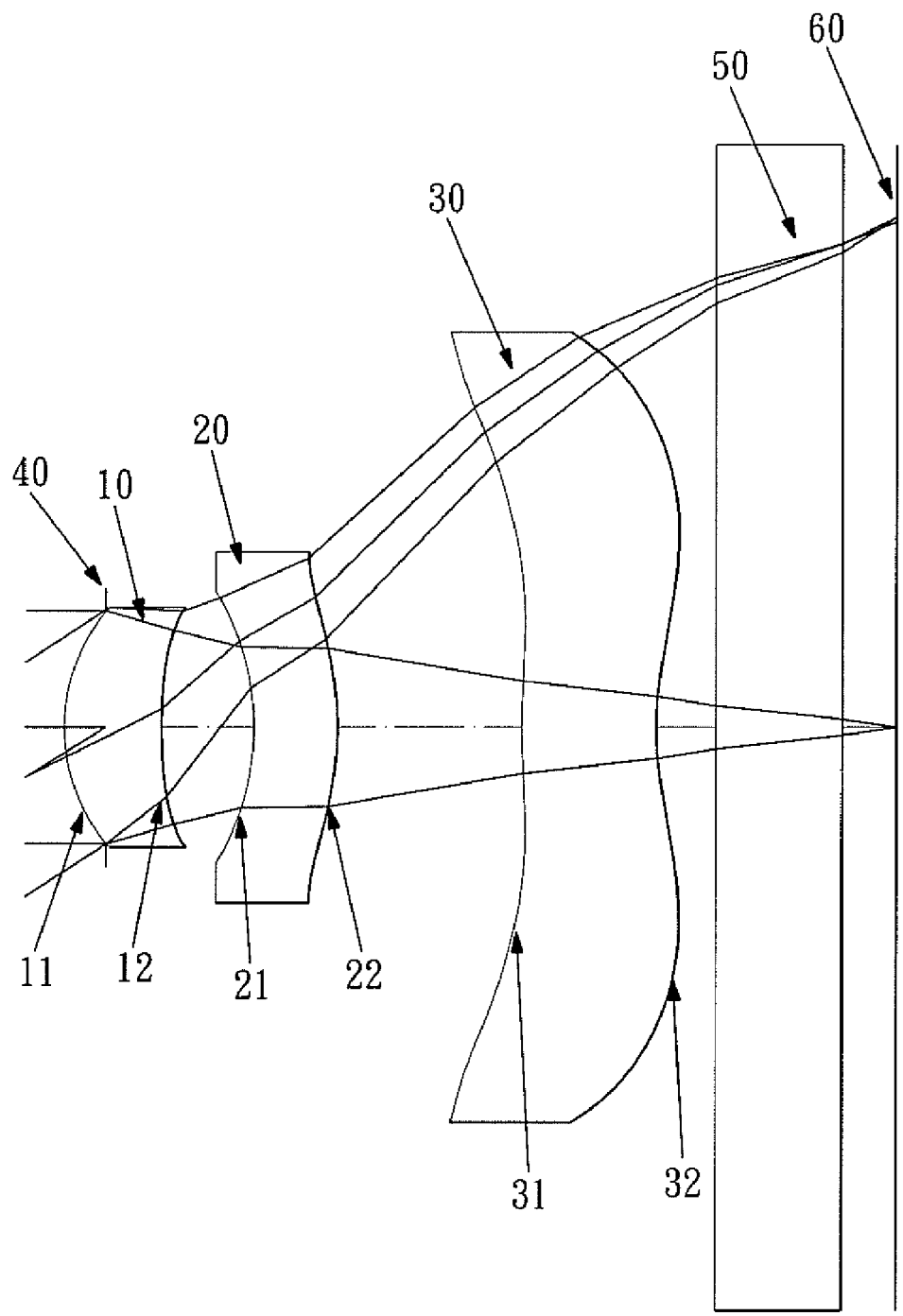
FIG. 1 shows an optical system for taking image in accordance with a first embodiment of the present invention.
Figure 2:
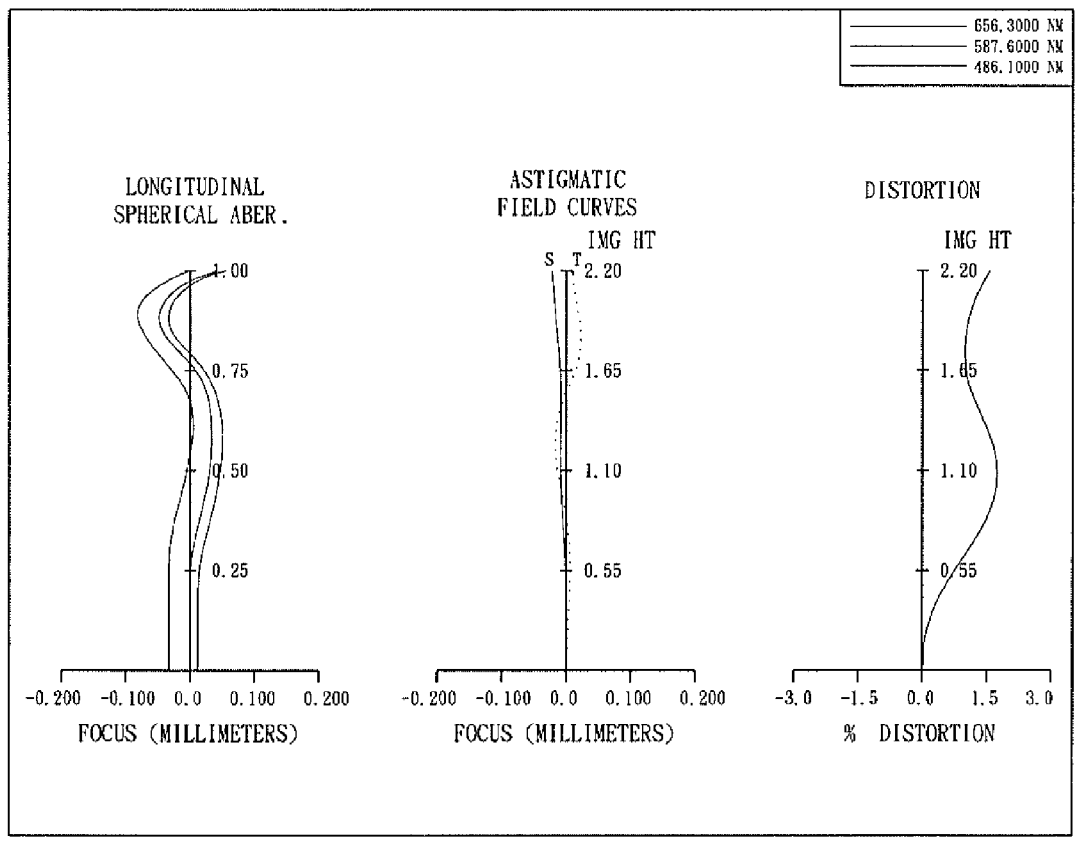
FIG. 2 shows the aberration curve of the first embodiment the present invention.

Referring to FIG. 1, which shows an optical system for taking image in accordance with a first embodiment of the present invention, and FIG. 2 shows the aberration curve of the first embodiment of the present invention. The first embodiment of the present invention is an optical system for taking image comprising three lenses with refractive power, and the optical system for taking image comprises: from the object side to the image side:

A plastic first lens element 10 with positive refractive power has a convex front surface 11 and a concave rear surface 12, and the front surface 11 and the rear surface 12 of the first lens element are aspheric.

A plastic second lens element 20 with negative refractive power has a concave front surface 21 and a convex rear surface 22, and the front surface 21 and the rear surface 22 of the second lens element are aspheric.

A plastic third lens element 30 with negative refractive power has a convex front surface 31 and a concave rear surface 32, the front surface 31 and the rear surface 32 of the third lens element are aspheric, and the third lens element 30 is formed with an inflection point.

An aperture stop 40 is located in front of the first lens element 10 for controlling brightness of the optical system.

An IR cut filter 50 is located behind the third lens element 30 and has no influence on the focal length of the optical system.

And an image plane 60 is located behind the IR cut filter 50.

The equation of the curve of the aspheric surfaces is expressed as follows:

$$X(Y)=(Y^2/R)/(1+\text{sqrt}(1-(1+k)*(Y/R)^2))+A_4*Y^4+A_6*Y^6+\ldots$$

wherein:

X: represents the distance of the cross section of the lens;

Y: the height from the point on the curve of the aspheric surface to the optical axis;

K: represents the conical coefficients;

A4, A6 . . . : the aspheric surface coefficients of the fourth and sixth order.

In the optical system for taking image, the Abbe number of the first lens element is V1, V1=60.3, which is formed by cyclic olefin copolymer, the Abbe number of the second lens element is V2, V2=23.4, which is formed by polyester and the Abbe number of the third lens element is V3, V3=55.8, which is formed by cyclic olefin polymer.

In the optical system for taking image, the radius of curvature of the front surface of the first lens element is R1, and the radius of curvature of the rear surface of the first lens element is R2. The radius of curvature of the front surface of the second lens element is R3, and the radius of curvature of the rear surface of the second lens element is R4. The radius of curvature of the front surface of the third lens element is R5, and the radius of curvature of the rear surface of the third lens element is R6. And they satisfy the relations: R1/R2=0.43, R3/R4=0.78, R5/R6=2.05.

In the optical system for taking image, the height SAG31 at the position of the effective diameter of the front surface of the third lens satisfies the relation: SAG31=−0.2 mm, the height of a surface at the position of the effective diameter is defined as: the height of a point on the surface at the effective diameter relative to a plane normal to the axis passing through the on-axis surface vertex. When the surface at the position of the effective diameter is closer to the image side than the on-axis surface vertex, the height is positive; if instead the surface at the position of the effective diameter is closer to the object side than the on-axis surface vertex, the height is negative.

In the optical system for taking image, the focal length of the first lens element is f1, the focal length of the second lens element is f2, the focal length of the third lens element is f3, and the focal length of the optical system is f, they satisfy the relations: |f/f1|=1.33, |f/f2|=0.23, |f/f3|=0.42.

In the optical system for taking image, the distance between the second lens element and the third lens element is T23, T23=0.776 mm.

In the optical system for taking image, the center thickness of the second lens element is CT2, CT2=0.350 mm In the optical system for taking image, the edge thickness of the first lens element is ET1, ET1=0.316 mm; and the edge thickness is: the length projected on an optical axis by the distance between the positions of the effective diameter of the front and the rear surfaces of the lens.

The data of the structure of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f = 3.28 mm, Fno = 3.2, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.168 | | | | |
| 2 | Lens 1 | 0.850470(ASP) | 0.412 | Plastic | 1.543 | 60.3 | 2.45 |
| 3 | | 1.957760(ASP) | 0.404 | | | | |
| 4 | Lens 2 | −1.213540(ASP) | 0.350 | Plastic | 1.632 | 23.4 | −13.82 |
| 5 | | −1.566740(ASP) | 0.776 | | | | |
| 6 | Lens 3 | 3.923500(ASP) | 0.572 | Plastic | 1.53 | 55.8 | −7.8 |
| 7 | | 1.911840(ASP) | 0.250 | | | | |
| 8 | IR-filter | Plano | 0.550 | Glass | 1.517 | 64.1 | — |
| 9 | | Plano | 0.248 | | | | |
| 10 | Image | Plano | | | | | |

TABLE 2

Aspheric Coefficient

| | Surface # | | | | | |
|---|---|---|---|---|---|---|
| | 2 | 3 | 4 | 5 | 6 | 7 |
| K = | 4.13678E−01 | 6.94736E+00 | 1.54334E+00 | −1.28981E+00 | −1.63591E+01 | −7.64748E+00 |
| A4 = | 5.86092E−02 | 1.73424E−01 | −1.40573E−01 | −9.32828E−02 | −2.49851E−01 | −1.23475E−01 |
| A6 = | −6.75368E−01 | 2.61910E−01 | 1.47810E+00 | 4.26576E−01 | 1.04941E−01 | 2.46266E−02 |
| A8 = | 3.78455E+00 | −3.64654E+00 | −1.02111E+01 | 1.67409E−01 | −2.20734E−02 | −7.63309E−03 |
| A10 = | −2.85594E+00 | 2.48079E+01 | 4.79806E+01 | 5.16132E−02 | 4.88411E−03 | 1.32535E−03 |
| A12 = | −5.21940E+00 | — | −8.44167E+01 | −2.77824E−01 | −7.66070E−04 | −1.54819E−04 |

Figure 3:
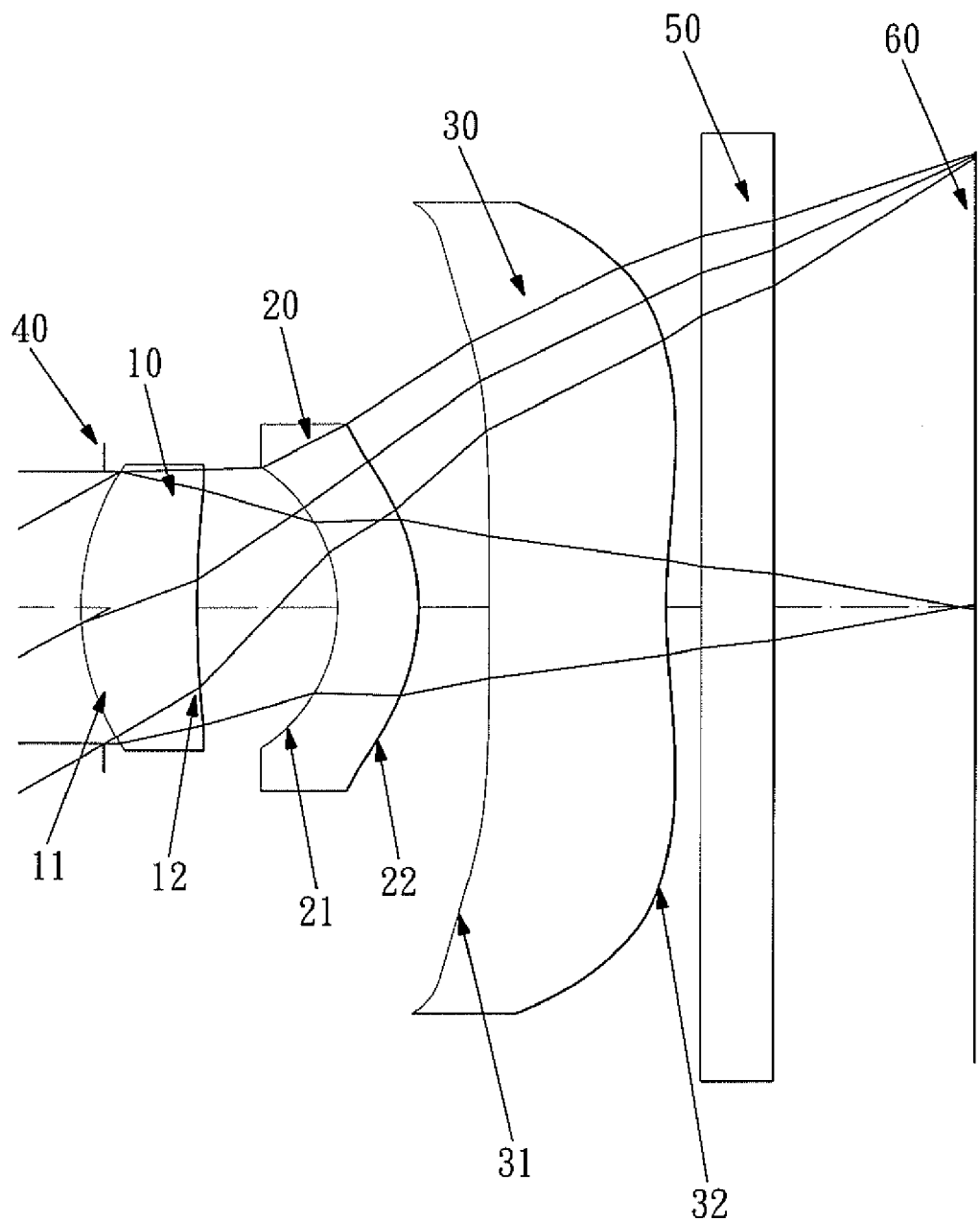
FIG. 3 shows an optical system for taking image in accordance with a second embodiment of the present invention.
Figure 4:
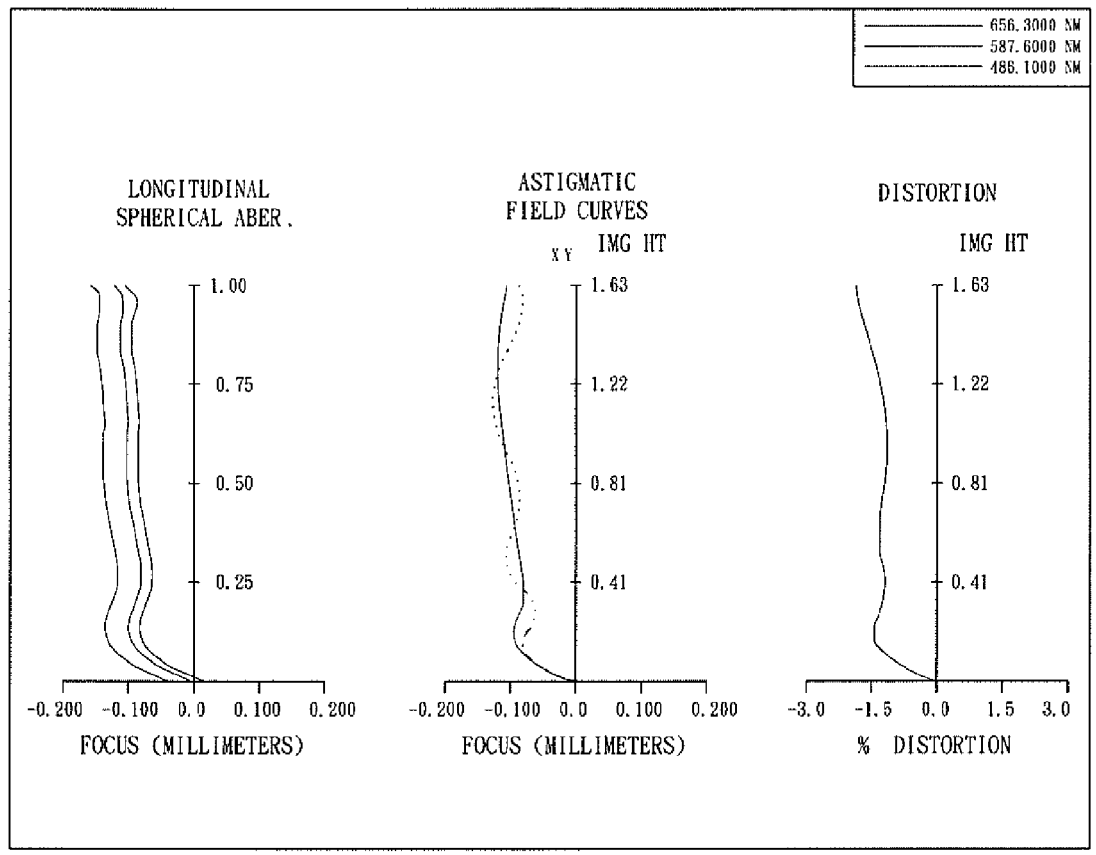
FIG. 4 shows the aberration curve of the second embodiment the present invention.

Referring to FIG. 3, which shows an optical lens assembly in accordance with a second embodiment of the present invention, and FIG. 4 shows the aberration curve of the second embodiment the present invention. The second embodiment of the present invention is an optical system for taking image comprising three lenses with refractive power, and the optical system for taking image comprises: from the object side to the image side:

A plastic first lens element 10 with positive refractive power has a convex front surface 11 and a concave rear surface 12, and the front surface 11 and the rear surface 12 of the first lens element 10 are aspheric.

A plastic second lens element 20 with negative refractive power has a concave front surface 21 and a convex rear surface 22, and the front surface 21 and the rear surface 22 of the second lens element 20 are aspheric.

A plastic third lens element 30 with negative refractive power has a convex front surface 31 and a concave rear surface 32, the front surface 31 and the rear surface 32 of the third lens element 30 are aspheric, and the third lens element 30 is formed with an inflection point.

An aperture stop 40 is located in front of the first lens element 10 for controlling brightness of the optical system.

An IR cut filter 50 is located behind the third lens element 30 and has no influence on the focal length of the optical system.

And an image plane 60 is located behind the IR cut filter 50.

The equation of the curve of the aspheric surfaces of the second embodiment is expressed as follows:

$$X(Y)=(Y^2/R)/(1+\mathrm{sqrt}(1-(1+k)*(Y/R)^2))+A_3*Y^3+A_4*Y^4+A_5*Y^5+A_6*Y^6\ldots$$

wherein:

X represents the distance of the cross section of the lens;

Y: the height from the point on the curve of the aspheric surface to the optical axis K: represents the conical coefficients;

$A_3, A_4, A_5, A_6\ldots$: the aspheric surface coefficients of the third, the fourth, the fifth and sixth order.

In the optical system for taking image, the Abbe number of the first lens element is V1, V1=60.3, which is formed by cyclic olefin copolymer, the Abbe number of the second lens element is V2, V2=26.6, which is formed by modified polycarbonate and the Abbe number of the third lens element is V3, V3=56.8, which is formed by cyclic olefin copolymer.

In the optical system for taking image, the radius of curvature of the front surface of the first lens element is R1, and the radius of curvature of the rear surface of the first lens element is R2. The radius of curvature of the front surface of the second lens element is R3, and the radius of curvature of the rear surface of the second lens element is R4. The radius of curvature of the front surface of the third lens element is R5, and the radius of curvature of the rear surface of the third lens element is R6. And they satisfy the relations: R1/R2=0.36, R3/R4=0.85, R5/R6=3.78.

In the optical system for taking image, the height SAG31 at the position of the effective diameter of the front surface of the third lens satisfies the relation: SAG31=−0.07 mm.

The definition of the height SAG31 is the same as that of the first embodiment.

In the optical system for taking image, the focal length of the first lens element is f1, the focal length of the second lens element is f2, the focal length of the third lens element is f3, and the focal length of the optical system is f, they satisfy the relations: |f/f1|=1.31, |f/f2|=0.03, |f/f3|=0.32.

In the optical system for taking image, the distance between the second lens element and the third lens element is T23, T23=0.250 mm.

In the optical system for taking image, the center thickness of the second lens element is CT2, CT2=0.291 mm In the optical system for taking image, the edge thickness of the first lens element is ET1, ET1=0.301 mm.

The definition of the edge thickness ET1 is the same as that of the first embodiment.

The data of the structure of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f = 2.84 mm, Fno = 2.9, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.103 | | | | |
| 2 | Lens 1 | 0.855000(ASP) | 0.415 | Plastic | 1.543 | 60.3 | 2.24 |
| 3 | | 2.392654(ASP) | 0.506 | | | | |
| 4 | Lens 2 | −0.647143(ASP) | 0.291 | Plastic | 1.606 | 26.6 | −99.79 |
| 5 | | −0.765429(ASP) | 0.250 | | | | |
| 6 | Lens 3 | 12.545486(ASP) | 0.637 | Plastic | 1.514 | 56.8 | −9.00 |
| 7 | | 3.318343(ASP) | 0.120 | | | | |
| 8 | IR-filter | Plano | 0.300 | Glass | 1.517 | 64.1 | — |
| 9 | | Plano | 0.715 | | | | |
| 10 | Image | Plano | | | | | |

TABLE 4

Aspheric Coefficient

| Surface# | | | | | | |
|---|---|---|---|---|---|---|
| | 2 | 3 | 4 | 5 | 6 | 7 |
| K = | −9.09011E−03 | 0.00000E+00 | 2.00000E−01 | −6.80147E−01 | −1.01534E+03 | −5.46241E+01 |
| A3 = | — | — | 1.34830E+00 | — | — | — |
| A4 = | −8.90588E−03 | 2.28389E−02 | −2.78042E+01 | 9.23467E−02 | −1.30910E−01 | −1.39140E−01 |
| A5 = | — | — | 2.89455E+02 | — | — | — |
| A6 = | 1.16362E+00 | −8.27833E−01 | −1.70863E+03 | −1.28816E−01 | 1.45831E−02 | 4.82871E−02 |
| A7 = | — | — | 6.01215E+03 | — | — | — |
| A8 = | −1.31019E+01 | 4.01551E+00 | −1.25128E+04 | −5.23687E−01 | 2.57478E−02 | −3.87895E−02 |
| A9 = | — | — | 1.42124E+04 | — | — | — |
| A10 = | 4.99850E+01 | −7.18899E+00 | −6.78739E+03 | 3.40459E+00 | −1.01720E−02 | 1.14310E−02 |
| A12 = | 5.92800E+01 | −1.33795E+02 | — | 3.73179E+00 | −6.22961E−03 | −9.43778E−04 |
| A14 = | −8.09900E+02 | 6.51120E+02 | — | −3.23721E+01 | 1.09343E−02 | 4.00375E−07 |
| A16 = | 1.34826E+03 | −1.05379E+03 | — | −6.09373E+00 | −3.60996E−03 | −3.17598E−04 |

Figure 5:
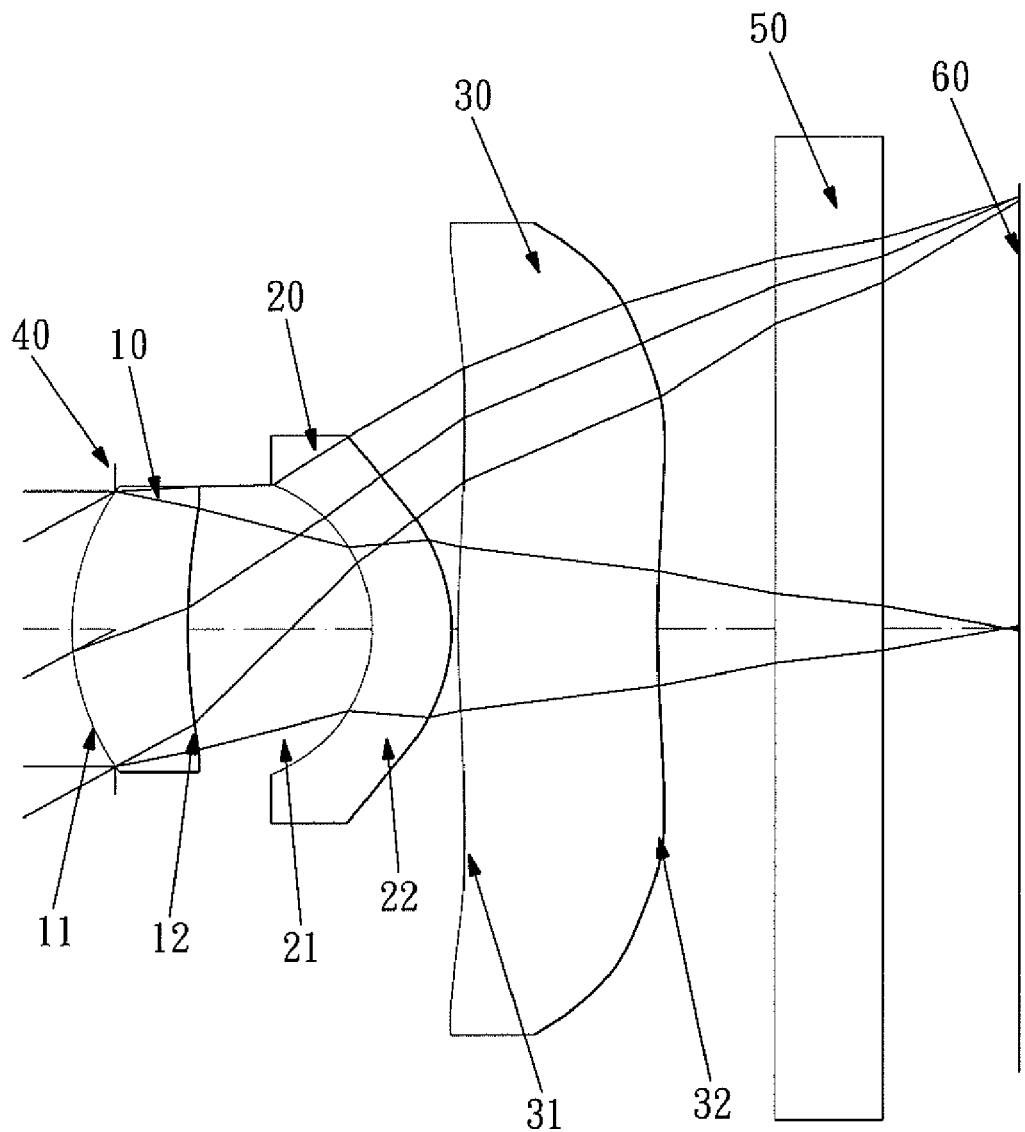
FIG. 5 shows an optical system for taking image in accordance with a third embodiment of the present invention.
Figure 6:
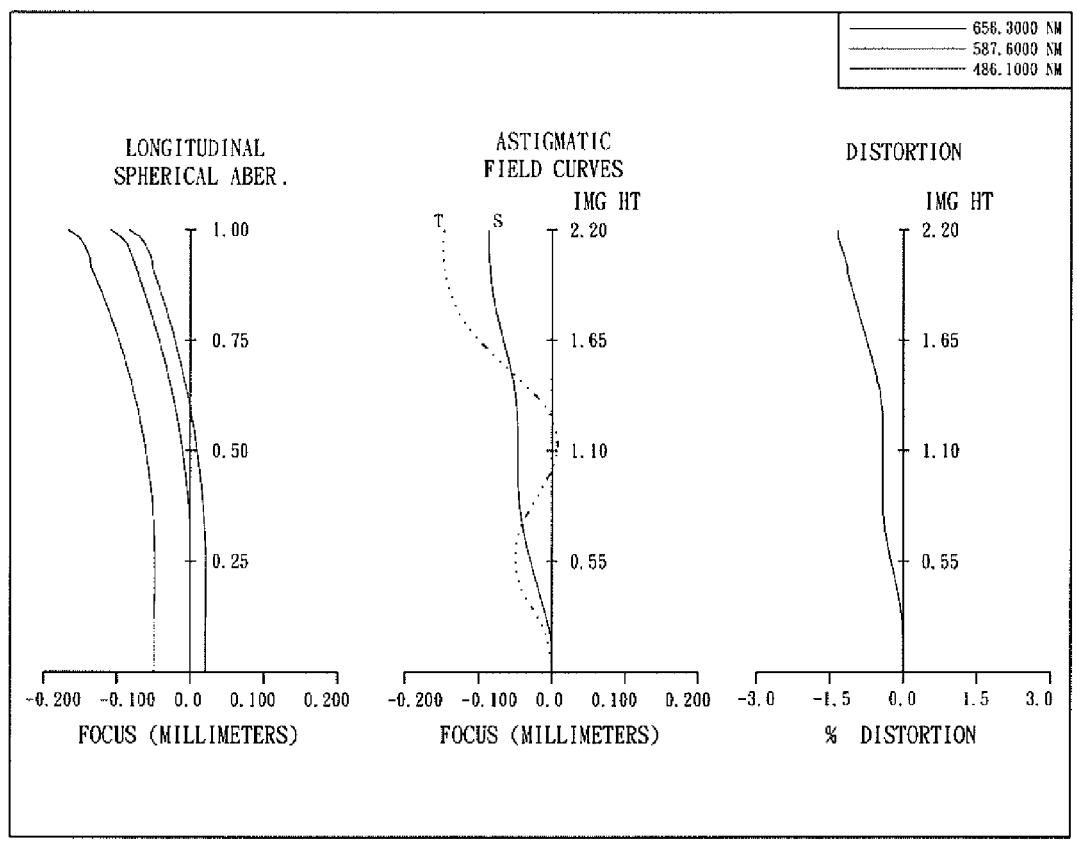
FIG. 6 shows the aberration curve of the third embodiment the present invention.

Referring to FIG. 5, which shows an optical lens assembly in accordance with a third embodiment of the present invention, and FIG. 6 shows the aberration curve of the third embodiment the present invention. The third embodiment of the present invention is an optical system for taking image comprising three lenses with refractive power, and the optical system for taking image comprises: from the object side to the image side:

A plastic first lens element 10 with positive refractive power has a convex front surface 11 and a concave rear surface 12, and the front surface 11 and the rear surface 12 of the first lens element are aspheric.

A plastic second lens element 20 with negative refractive power has a concave front surface 21 and a convex rear surface 22, and the front surface 21 and the rear surface 22 of the second lens element are aspheric.

A plastic third lens element 30 with negative refractive power has a convex front surface 31 and a concave rear surface 32, the front surface 31 and the rear surface 32 of the third lens element are aspheric, and the third lens element 30 is formed with an inflection point.

An aperture stop 40 is located in front of the first lens element 10 for controlling brightness of the optical system.

An IR cut filter 50 is located behind the third lens element 30 and has no influence on the focal length of the optical system.

And an image plane 60 is located behind the IR cut filter 50.

The equation of the curve of the aspheric surfaces of the third embodiment is the same as that of the first embodiment.

In the optical system for taking image, the Abbe number of the first lens element is V1, V1=60.3, which is formed by cyclic olefin copolymer, the Abbe number of the second lens element is V2, V2=30.2, which is formed by polycarbonate, and the Abbe number of the third lens element is V3, V3=56.8, which is formed by cyclic olefin copolymer.

In the optical system for taking image, the radius of curvature of the front surface of the first lens element is R1, and the radius of curvature of the rear surface of the first lens element is R2. The radius of curvature of the front surface of the second lens element is R3, and the radius of curvature of the rear surface of the second lens element is R4. The radius of curvature of the front surface of the third lens element is R5, and the radius of curvature of the rear surface of the third lens element is R6. And they satisfy the relations: R1/R2=0.37, R3/R4=0.83, R5/R6=1.22.

In the optical system for taking image, the height SAG31 at the position of the effective diameter of the front surface of the third lens satisfies the relation: SAG31=0.02 mm.

The definition of the height SAG31 is the same as that of the first embodiment.

In the optical system for taking image, the focal length of the first lens element is f1, the focal length of the second lens element is f2, the focal length of the third lens element is f3, and the focal length of the optical system is f, they satisfy the relations: |f/f1|=1.18, |f/f2|=0.03, |f/f3|=0.05.

In the optical system for taking image, the distance between the second lens and the third lens element is T23, T23=0.037 mm.

In the optical system for taking image, the center thickness of the second lens element is CT2, CT2=0.400 mm.

In the optical system for taking image, the edge thickness of the first lens element is ET1, ET1=0.420 mm.

The definition of the edge thickness ET1 is the same as that of the first embodiment.

The data of the structure of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f = 3.95 mm, Fno = 2.9, HFOV = 29.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.200 | | | | |
| 2 | Lens 1 | 1.281720(ASP) | 0.571 | Plastic | 1.543 | 60.3 | 3.4 |
| 3 | | 3.481000(ASP) | 0.918 | | | | |

TABLE 5-continued (Embodiment 3)
f = 3.95 mm, Fno = 2.9, HFOV = 29.3 deg.

| Surface # | | Curvature Radius | Thickness | Material | Index | Abbe # | Focal length |
|---|---|---|---|---|---|---|---|
| 4 | Lens 2 | −0.755200(ASP) | 0.400 | Plastic | 1.583 | 30.2 | −164.22 |
| 5 | | −0.910540(ASP) | 0.037 | | | | |
| 6 | Lens 3 | 7.020800(ASP) | 0.994 | Plastic | 1.514 | 56.8 | −84.63 |
| 7 | | 5.757000(ASP) | 0.590 | | | | |
| 8 | IR-filter | Plano | 0.550 | Glass | 1.517 | 64.1 | — |
| 9 | | Plano | 0.665 | | | | |
| 10 | Image | Plano | | | | | |

TABLE 6

Aspheric Coefficient

| | Surface# | | | | | |
|---|---|---|---|---|---|---|
| | 2 | 3 | 4 | 5 | 6 | 7 |
| K = | 7.24678E−01 | 8.51853E+00 | −1.09515E−01 | −6.91348E−01 | −3.30057E+02 | −7.72533E+01 |
| A4 = | −4.88660E−02 | −1.45840E−02 | 1.42398E−01 | −3.23556E−02 | −1.99736E−03 | −6.16373E−02 |
| A6 = | 8.12733E−02 | −1.30103E−01 | −1.24621E+00 | 1.04525E−01 | −7.65632E−03 | 1.69540E−02 |
| A8 = | −5.33854E−01 | 4.36001E−02 | 5.17135E+00 | −6.89813E−02 | 1.29798E−03 | −4.67535E−03 |
| A10 = | 7.57624E−01 | −1.77727E−01 | −8.80124E+00 | 3.86481E−02 | 2.54344E−04 | 5.05344E−04 |
| A12 = | 5.54123E−01 | 4.89912E−02 | 5.22910E+00 | 2.72602E−02 | −4.87733E−05 | −1.63464E−05 |
| A14 = | −3.34844E+00 | −6.17856E−01 | 1.39889E+00 | 9.25956E−03 | 1.73398E−06 | 1.66355E−07 |
| A16 = | 2.56517E+00 | 8.91901E−02 | −2.45845E+00 | 1.45327E−03 | −3.00608E−07 | −5.74485E−07 |

Figure 7:
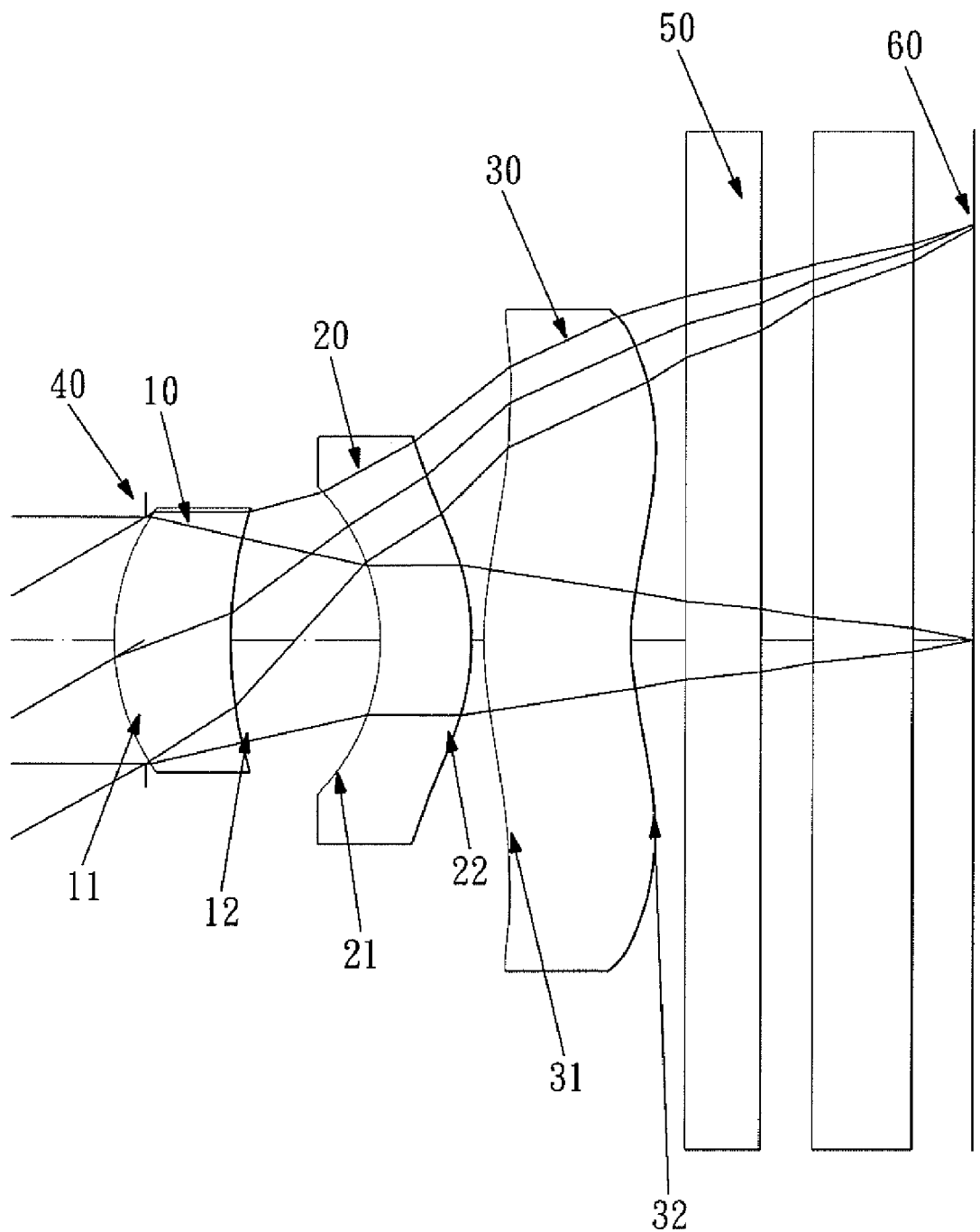
FIG. 7 shows an optical system for taking image in accordance with a fourth embodiment of the present invention.
Figure 8:
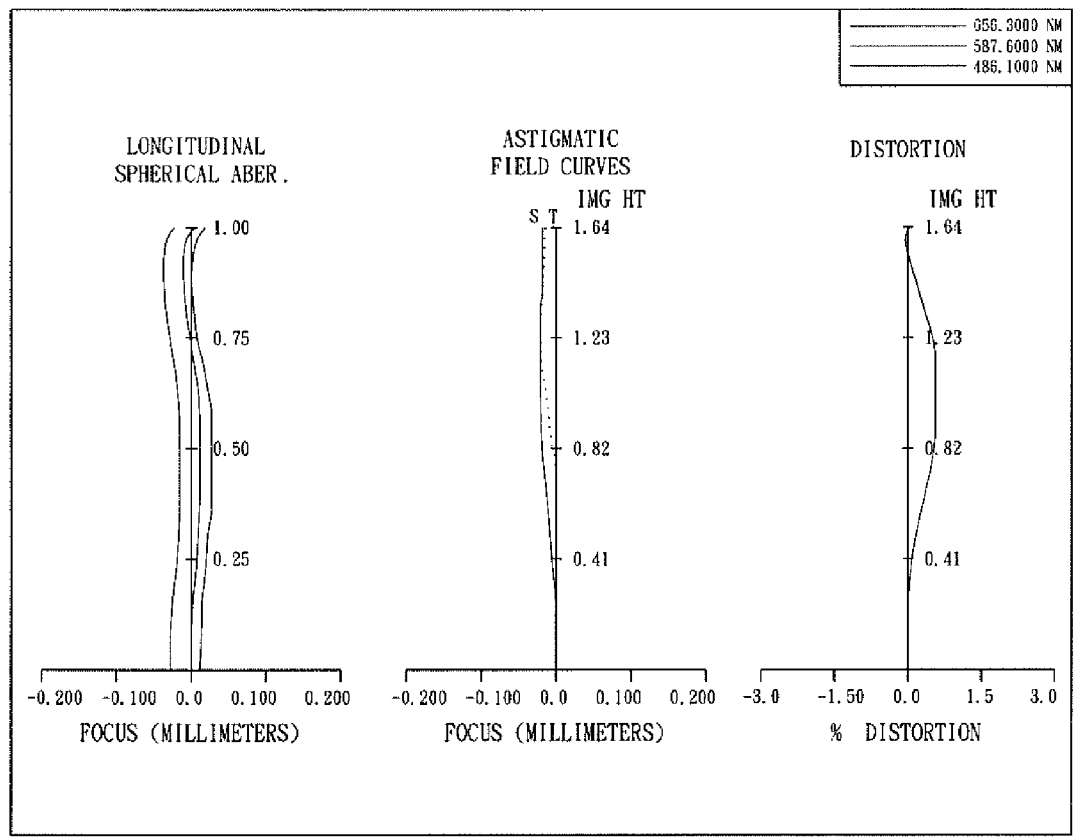
FIG. 8 shows the aberration curve of the fourth embodiment the present invention.

Referring to FIG. 7, which shows an optical lens assembly in accordance with a fourth embodiment of the present invention, and FIG. 8 shows the aberration curve of the fourth embodiment the present invention. The fourth embodiment of the present invention is an optical system for taking image comprising three lenses with refractive power, and the optical system for taking image comprises: from the object side to the image side:

A plastic first lens element 10 with positive refractive power has a convex front surface 11 and a concave rear surface 12, and the front surface 11 and the rear surface 12 of the first lens element are aspheric.

A plastic second lens element 20 with negative refractive power has a concave front surface 21 and a convex rear surface 22, and the front surface 21 and the rear surface 22 of the second lens element are aspheric.

A plastic third lens element 30 with negative refractive power has a convex front surface 31 and a concave rear surface 32, the front surface 31 and the rear surface 32 of the third lens element are aspheric, and the third lens element 30 is formed with an inflection point.

An aperture stop 40 is located in front of the first lens element 10 for controlling brightness of the optical system.

An IR cut filter 50 is located behind the third lens element 30 and has no influence on the focal length of the optical system.

And an image plane 60 is located behind the IR cut filter 50.

The equation of the curve of the aspheric surfaces of the fourth embodiment is the same as that of the first embodiment.

In the optical system for taking image, the Abbe number of the first lens element is V1, V1=60.3, which is formed by cyclic olefin copolymer, the Abbe number of the second lens element is V2, V2=23.4, which is formed by polyester and the Abbe number of the third lens element is V3, V3=55.8, which is formed by cyclic olefin polymer.

In the optical system for taking image, the radius of curvature of the front surface of the first lens element is R1, and the radius of curvature of the rear surface of the first lens element is R2. The radius of curvature of the front surface of the second lens element is R3, and the radius of curvature of the rear surface of the second lens element is R4. The radius of curvature of the front surface of the third lens element is R5, and the radius of curvature of the rear surface of the third lens element is R6. And they satisfy the relations: R1/R2=0.38, R3/R4=0.81, R5/R6=1.12.

In the optical system for taking image, the height SAG31 at the position of the effective diameter of the front surface of the third lens satisfies the relation: SAG31=0.09 mm.

The definition of the height SAG31 is the same as that of the first embodiment.

In the optical system for taking image, the focal length of the first lens element is f1, the focal length of the second lens element is f2, the focal length of the third lens element is f3, and the focal length of the optical system is f, they satisfy the relations: |f/f1|=1.12, |f/f2|=0.09, |f/f3|=0.01.

In the optical system for taking image, the distance between the second lens element and the third lens element is T23, T23=0.050 mm.

In the optical system for taking image, the center thickness of the second lens element is CT2, CT2=0.350 mm.

In the optical system for taking image, the edge thickness of the first lens element is ET1, ET1=0.382 mm.

The definition of the edge thickness ET1 is the same as that of the first embodiment.

The data of the structure of the fourth embodiment is shown in table 7, and the aspheric surface data is shown in table 8, wherein the units of the radius of curvature, the thickness and the focal length are expressed in mm, and HFOV is half of the maximal field of view.

TABLE 7

(Embodiment 4)
f = 2.72 mm, Fno = 2.8, HFOV = 31 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.122 | | | | |
| 2 | Lens 1 | 0.909760(ASP) | 0.464 | Plastic | 1.543 | 60.3 | 2.43 |
| 3 | | 2.381100(ASP) | 0.589 | | | | |
| 4 | Lens 2 | −0.739230(ASP) | 0.350 | Plastic | 1.632 | 23.4 | −31.76 |
| 5 | | −0.908820(ASP) | 0.050 | | | | |
| 6 | Lens 3 | 1.942070(ASP) | 0.576 | Plastic | 1.53 | 55.8 | −534.02 |
| 7 | | 1.730080(ASP) | 0.200 | | | | |
| 8 | IR-filter | Plano | 0.300 | Glass | 1.517 | 64.1 | — |
| 9 | | Plano | 0.200 | | | | |
| 10 | Cover Glass | Plano | 0.400 | | | | |
| | | Plano | 0.222 | | | | |
| | Image | Plano | | | | | |

TABLE 8

Aspheric Coefficient

| | Surface# | | | | | |
|---|---|---|---|---|---|---|
| | 2 | 3 | 4 | 5 | 6 | 7 |
| K = | −3.55500E−01 | 6.50000E+00 | −2.12408E+00 | −8.81975E−01 | −4.66290E+00 | −1.63726E+01 |
| A4 = | 9.23155E−02 | 1.59053E−01 | −4.17492E−02 | 3.11811E−01 | −1.92130E−01 | −9.28374E−02 |
| A6 = | 2.44473E−01 | −4.98554E−01 | −4.65739E−01 | −1.47795E−01 | 1.19222E−01 | −1.99965E−02 |
| A8 = | 1.31179E−01 | 2.43305E+00 | 6.23612E−02 | 2.46871E−01 | −7.42736E−02 | 1.71106E−02 |
| A10 = | — | — | −6.10061E−01 | — | 3.51633E−02 | −1.04139E−02 |
| A12 = | — | — | −7.04666E+00 | — | −6.71292E−03 | 1.65932E−03 |

TABLE 9

| | Embodiment 1 | Embodiment 2 | Embodiment 3 | Embodiment 4 |
|---|---|---|---|---|
| f | 3.28 | 2.84 | 3.95 | 2.72 |
| Fno | 3.2 | 2.9 | 2.9 | 2.8 |
| HFOV | 33.5 | 30.0 | 29.3 | 31.0 |
| V1 | 60.3 | 60.3 | 60.3 | 60.3 |
| V2 | 23.4 | 26.6 | 30.2 | 23.4 |
| V3 | 55.8 | 56.8 | 56.8 | 55.8 |
| R1/R2 | 0.43 | 0.36 | 0.37 | 0.38 |
| R3/R4 | 0.78 | 0.85 | 0.83 | 0.81 |
| R5/R6 | 2.05 | 3.78 | 1.22 | 1.12 |
| SAG31 | −0.20 | −0.07 | 0.02 | 0.09 |
| |f/f1| | 1.33 | 1.31 | 1.18 | 1.12 |
| |f/f2| | 0.23 | 0.03 | 0.03 | 0.09 |
| |f/f3| | 0.42 | 0.32 | 0.05 | 0.01 |
| T23 | 0.776 | 0.250 | 0.037 | 0.050 |
| CT2 | 0.350 | 0.291 | 0.400 | 0.350 |
| ET1 | 0.316 | 0.301 | 0.420 | 0.382 |

It is to be noted that the tables 1-8 show different data of the different embodiments, however, the data of the different embodiments is obtained from experiments. Therefore, any product of the same structure is contemplated to be within the scope of the present invention even if it uses different data. Table 9 is the data of the respective embodiments resulted from the equations.

While we have shown and described various embodiments in accordance with the present invention, it should be clear to those skilled in the art that further embodiments may be made without departing from the scope of the present invention.

What is claimed is:

1. An optical system for taking image comprising three lens elements with refractive power, from the object side to the image side:

a first lens element with positive refractive power having at least one aspheric surface;

a second lens element with negative refractive power;

a third lens element with negative refractive power having at least one aspheric surface;

wherein the second lens element and the third lens element are made of plastic material, and the front surface and the rear surface of the second lens element and the third lens element are aspheric;

the front surface and the rear surface of the first lens element, the second lens element and the third lens element are aspheric;

the first lens element has a convex front surface and a concave rear surface, the second lens element has a concave front surface and a convex rear surface, the third lens element has a convex front surface and a concave rear surface, and the third lens element is formed with at least one inflection point;

an aperture stop is located in front of the first lens element;

a focal length of the third lens element is f3, a focal length of the optical system is f, they satisfy the relation: $|f/f3|>0.2$;

an Abbe number of the second lens element is V2, and it satisfies the relation: $V2<24$.

2. The optical system for taking image as claimed in claim 1, wherein a height SAG31 at the position of the effective diameter of the front surface of the third lens is defined as a height of a point on the surface at the effective diameter relative to a plane normal to the axis passing through the on-axis surface vertex, when the surface at the position of the effective diameter is closer to the image side than the on-axis surface vertex, the height is positive; if instead the surface at the position of the effective diameter is closer to the object side than the on-axis surface vertex, the height is negative, the height SAG31 satisfies the relation: SAG31<−0.1 mm.

3. The optical system for taking image as claimed in claim 1, wherein an Abbe number of the first lens element is V1, an Abbe number of the third lens element is V3, and they satisfy the relations: V1>50, V3>50.

4. The optical system for taking image as claimed in claim 1, wherein a radius of curvature of the front surface of the first lens element is R1, the radius of curvature of the rear surface of the first lens element is R2, and they satisfy the relations: 0.2<R1/R2<0.5.

5. The optical system for taking image as claimed in claim 4, wherein a radius of curvature of the front surface of the second lens element is R3, a radius of curvature of the rear surface of the second lens element is R4, and they satisfy the relations: 0.6<R3/R4<1.0.

6. The optical system for taking image as claimed in claim 5, wherein a radius of curvature of the front surface of the third lens element is R5, a radius of curvature of the rear surface of the third lens element is R6, and they satisfy the relations: 1.0<R5/R6<5.0.

7. The optical system for taking image as claimed in claim 6, wherein the radius of curvature of the front surface of the third lens element is R5, the radius of curvature of the rear surface of the third lens element is R6, and they satisfy the relations: 1.5<R5/R6<4.0.

8. The optical system for taking image as claimed in claim 1, wherein the height SAG31 at the position of the effective diameter of the front surface of the third lens is defined as a height of a point on the surface at the effective diameter relative to a plane normal to the axis passing through the on-axis surface vertex, when the surface at the position of the effective diameter is closer to the image side than the on-axis surface vertex, the height is positive; if instead the surface at the position of the effective diameter is closer to the object side than the on-axis surface vertex, the height is negative, the height SAG31 satisfies the relation: SAG31<0 mm.

9. The optical system for taking image as claimed in claim 1, wherein a focal length of the first lens element is f1, a focal length of the second lens element is f2, the focal length of the optical system is f, and they satisfy the relation: |f/f1|>1.0, |f/f2|>0.1.

10. The optical system for taking image as claimed in claim 1, wherein a distance between the second lens element and the third lens element is T23, and it satisfies the relation: T23>0.2 mm.

11. The optical system for taking image as claimed in claim 1, wherein the center thickness of the second lens element is CT2, and it satisfies the relation: CT2<0.38 mm.

12. The optical system for taking image as claimed in claim 11, wherein a edge thickness of the first lens element is ET1, and it satisfies the relation: ET1<0.4 mm.

* * * * *